A. M. SOSA & W. P. WINTERS.
STOP MECHANISM.
APPLICATION FILED MAY 10, 1917.
1,280,571.
Patented Oct. 1, 1918.
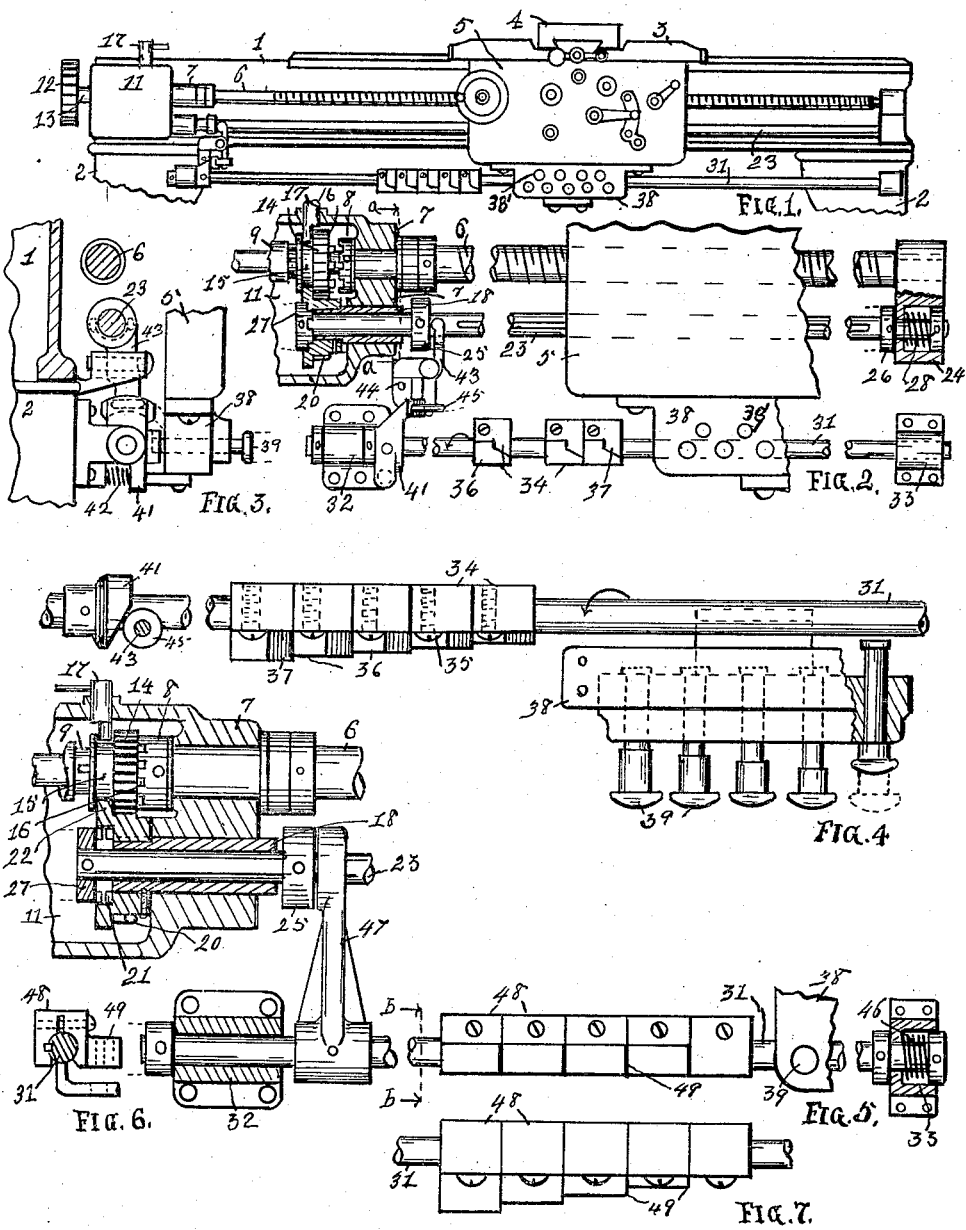
Witnesses,
J. W. Wurtz
P. A. Carr
Inventors,
August M. Sosa,
and William P. Winters.
By Robert S. Carr, Attorney.

UNITED STATES PATENT OFFICE.

AUGUST M. SOSA AND WILLIAM P. WINTERS, OF CINCINNATI, OHIO, ASSIGNORS TO THE AMERICAN TOOL WORKS COMPANY, OF CINCINNATI, OHIO, A CORPORATION OF WEST VIRGINIA.

STOP MECHANISM.

1,280,571.  Specification of Letters Patent.  Patented Oct. 1, 1918.

Application filed May 10, 1917. Serial No. 167,671.

*To all whom it may concern:*

Be it known that we, AUGUST M. SOSA and WILLIAM P. WINTERS, citizens of the United States, residing in Cincinnati, Hamilton county, Ohio, have invented certain new and useful Improvements in Stop Mechanisms, of which the following is a specification.

Our invention relates to engine lathes and other machine tools, and has for its prime object to provide for automatically discontinuing the operation of the cutting tool at predetermined points in its feeding movement.

The invention is embodied in the form of stop mechanism which is capable of being set or adjusted to bring about either a selective stopping or a successive stopping of the operation of the cutting tool. This object is accomplished by an initial setting of one or more stops which coöperate with dogs adjusted at predetermined intervals, and which stops require no further adjustment after their original setting, it being merely sufficient to withdraw that stop which has operated to disconnect the driving mechanism in order that the machine may resume its operation until stopped by another stop in accordance with the setting of the stops.

An embodiment of the invention has been shown in the accompanying drawings, wherein:

Figure 1 is a front elevation of an engine lathe with portions removed and embodying our improvements; Fig. 2, a front elevation with portions broken away and portions in section showing an assemblage of the automatic stop mechanism for the feed rod; Fig. 3, an end elevation with portions in section on the broken line *a—a* of Fig. 2; Fig. 4, a plan with portions broken away and portions in section of the shifting rod showing the dogs and certain corresponding stops in operative position; Fig. 5, a front elevation with portions broken away and portions removed showing the shifting rod provided with dogs of modified form of construction and with a shifting arm for the feed rod; Fig. 6, a transverse section on the line *b—b* of Fig. 5; and Fig. 7 a plan of the dogs shown in Fig. 6.

In the drawings, 1 represents the bed of an engine lathe with the head and tail stocks removed; 2 portions of the supporting legs; 3 the tool carriage provided with the cross slide 4 and the depending apron 5; 6 the lead screw journaled in the bearing 7 and provided with the clutch member 8; 9 a sleeve loose on the lead screw within the speed box 11 and driven from the gear 12 through the shaft 13 and a set of change speed gears, not shown, within the speed box; 14 a gear splined on the sleeve 9 and formed with the annular groove 15 and the clutch member 16; 17 a shifter for gear 14 for moving it longitudinally with said clutch member into engagement with the coacting member 8, as shown in Fig. 5, for actuating the lead screw, all being constructed and arranged in the ordinary manner.

The sleeve 18 journaled in the bearing 7 is provided with the gear 20 in continuous engagement with the driven gear 14 and formed with the clutch member 21 and with the annular shifting collar 22 in engagement with the groove 15. Said gear and sleeve are movable longitudinally in unison with the shifting of the gear 14 on sleeve 18.

The feed rod 23, journaled in the sleeve 18 and the bearing 24, is provided with the adjustable collars 25 and 26 with the clutch member 27. The spring 28 serves to move the feed rod 23 longitudinally and maintain it under a yielding pressure with the stop collar 26 in contact with the bearing 24 and with the clutch member thereon in engagement with the coacting clutch member 21 as shown in Fig. 2 for actuating said rod to impart the feeding movement in the usual manner to the carriage through the ordinary apron gear connections, not shown.

The shifting rod 31 journaled in bearings 32 and 33 is provided with a series of dogs 34 which may be selectively and independently secured in predetermined longitudinal positions of adjustment thereon by means of the clamping screws 35. Said dogs project laterally to form steps 36, each having an inclined wall 37 as shown in Fig. 4. The depending extension 38 of the apron is provided with a series of movable stops or pull pins 39 in fixed distance relations and adapted to be carried thereby into successive engagement with the corresponding inclined walls 37 for rocking the shifting rod 31 together with the cam collar 41 thereon in an outward direction against the exertion of the spring 42. The yoke lever 43, fulcrumed in the bracket 44, engages at one end with the collar 25 and is provided at the other end with the antifriction roller 45 in engagement with the cam collar 41 whereby said lever is actuated to shift the feed rod longitudinally against the exertion of the spring 28 for disengaging the clutch member 27 thereon from the driven coacting member 21 and discontinuing the action of said rod and the carriage with the cutting tool. The depending extension 38 of the apron is provided with a series of openings 38′, through which access may be had to the screws 35 of such dogs as may be covered up by said extension.

In the construction shown in Figs. 5, 6 and 7, the rod 31 is movable longitudinally instead of rotatively and against the exertion of the spring 46 for actuating the arm 47 thereon to disengage the feed rod from its driven connections. For this purpose the dogs 34 having inclined walls 37 are substituted by the dogs 48 having vertical walls 49 for the abrupt contact therewith of the corresponding stops 39.

In operation, when the gear 14 is shifted to engage the clutch connections with the lead screw, the gear 20 with the sleeve 18 is thereby moved in the same direction. In this position of the gears the contact of the stop collar 26 against the bearing 24 limits the movement of the feed rod under the exertion of the spring 28 and prevents the engagement of the clutch member 27 thereon with the clutch member 21 as shown in Fig. 5. A shifting of said gears in the opposite direction and out of engagement with the lead screw permits the engagement of the clutch connections with the feed rod. In this manner the lead screw and feed rod can be actuated only alternately.

After the blank to be turned is placed in the lathe in the usual manner, the carriage may be adjusted with the cutting tool in registration with the intended location of the offset nearest the tail stock, the corresponding dog may then be adjusted on the shifting rod in engagement with its coacting stop.

The successive dogs and stops may be adjusted in like manner with the tool in registration with the corresponding intended offsets. The carriage being actuated by the feed rod in the usual manner carries the corresponding stop into engagement with the step on the first dog and actuates the shifting rod to move the feed rod longitudinally out of engagement with its driving gear and discontinue the cutting action of the tool as it registers with the first offset on the spindle. The operator then disengages the stop from the dog, the exertion of spring 28 automatically reëngages the feed shaft with its gear. The succeeding stops may be in like manner automatically engaged with and successively disengaged from the dogs with the cutting tool in registration with the corresponding offsets in the spindle.

Having fully described our improvements, what we claim as our invention and desire to secure by Letters Patent of the United States is:

1. An automatic stop mechanism, for machine tools, including a plurality of dogs for actuating the stop mechanism, and a plurality of stops manually settable for selective actuation of the dogs.

2. An automatic stop mechanism, for machine tools, including a shift rod, a plurality of dogs adjustable upon the shift rod, and a stop device to be carried by the tool carriage of the machine and provided with a plurality of stops settable for selective actuation of the dogs.

3. An automatic stop mechanism, for machine tools, including a plurality of dogs for actuating the stop mechanism and a plurality of stops manually settable for selective and successive actuation of the dogs.

4. An automatic mechanism, for machine tools, including a shift rod, a plurality of dogs adjustable upon the shift rod and a stop device to be carried by the tool carriage of the machine and provided with a plurality of stops settable for selective and successive actuation of the dogs.

5. An automatic stop mechanism for machine tools, including a shift rod, a plurality of dogs adjustable upon the shift rod, and a stop device to be carried by a tool carriage and carrying a plurality of stops in the form of push pins capable of being set for coöperation with their respective dogs.

6. An automatic stop mechanism, for machine tools, including a shift rod, a plurality of dogs adjustable upon the shift rod, and a stop device including a body to be carried by a tool carriage and carrying a plurality of stops in the form of push pins, each push pin having a shoulder for engagement with the body to stop the pin in its adjusted position for coöperation with its corresponding dog.

7. An automatic stop mechanism, for machine tools, including an oscillatory shift rod, a plurality of dogs adjustable upon the shift rod, and means for selective actuation of any of the dogs to oscillate the rod.

8. An automatic stop mechanism, for machine tools, including an oscillatory shift rod, a plurality of dogs adjustable upon the shift rod, and means for selective actuation of any of the dogs to oscillate the rod, said means including a plurality of stops settable for coöperation with respective dogs.

9. The combination with a machine tool having a traveling carriage, of automatic stop mechanism including a shift rod, a plurality of dogs adjustable upon the shift rod, and a stop device including a body carried by the carriage and traveling in parallelism with the shift rod, and a plurality of stops in the form of push pins carried by said body and capable of being adjusted endwise into positions for coöperation with the respective dogs.

A. M. SOSA.
WM. P. WINTERS.

Witnesses:
 WILLARD R. JONES,
 G. WALDVOGEL.

Copies of this patent may be obtained for five cents each, by addressing the "Commissioner of Patents, Washington, D. C."